(12) United States Patent
Appanna et al.

(10) Patent No.: US 8,155,129 B2
(45) Date of Patent: Apr. 10, 2012

(54) SUSPENDING OPERATION OF BORDER GATEWAY PROTOCOL

(75) Inventors: Chandrashekhar Appanna, Cupertino, CA (US); Abhay Roy, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 819 days.

(21) Appl. No.: 11/731,516

(22) Filed: Mar. 30, 2007

(65) Prior Publication Data

US 2008/0089231 A1    Apr. 17, 2008

Related U.S. Application Data

(63) Continuation of application No. 11/581,063, filed on Oct. 13, 2006.

(51) Int. Cl.
*H04L 12/28* (2006.01)
*H04L 12/56* (2006.01)
*H04J 3/06* (2006.01)

(52) U.S. Cl. .................. 370/401; 370/255; 370/503

(58) Field of Classification Search ............... 370/255, 370/401, 503
See application file for complete search history.

(56) References Cited

U.S. PATENT DOCUMENTS

| | | | |
|---|---|---|---|
| 6,704,795 B1 | 3/2004 | Fernando et al. | |
| 7,359,377 B1 | 4/2008 | Kompella et al. | |
| 7,418,519 B1 * | 8/2008 | Chavali | 709/242 |
| 2002/0062373 A1 | 5/2002 | Skingle | |
| 2004/0090913 A1 | 5/2004 | Scudder et al. | |
| 2004/0223491 A1 * | 11/2004 | Levy-Abegnoli et al. | 370/389 |
| 2008/0089348 A1 | 4/2008 | Appanna et al. | |

OTHER PUBLICATIONS

F. Baker, "OSPF V3 as a MANET Protocol," Cisco Systems, Inc., 2004, pp. 1-13.
R. Coltun et al., "OSPF for IPv6," Internet Engineering Task Force (IETF) Request for Comments (RFC) 2740, Dec. 1999, pp. 1-65.
F. Baker, "An outsider's view of MANET," IETF internet-draft "draft-baker-manet-review-01," Mar. 17, 2002, pp. 1-40.
Y. Rekhter et al., "A Border Gateway Protocol 4 (BGP-4)," IETF RFC 1771, Mar. 1995, pp. 1-47.
S. Sangli et al., "Graceful Restart Mechanism for BGP," IETF RFC 4724, Jan. 2007, pp. 1-13.
S. Ramachandra et al., "Graceful Restart Mechanism for BGP," IETF Internet-draft "draft-ietf-idr-restart-01.txt," Jul. 2001, pp. 1-8.

* cited by examiner

*Primary Examiner* — Hassan Phillips
*Assistant Examiner* — Lonnie Sweet
(74) *Attorney, Agent, or Firm* — Hickman Palermo Truong & Becker LLP

(57) ABSTRACT

A checkpointing approach enables BGP peers to reduce the number of UPDATE messages that are exchanged and processed after a router restarts and to pause and suspend BGP sessions when mobile nodes leave a BGP domain. In an embodiment, a router is configured for receiving a BGP pause message from a mobile node; suspending interaction with the mobile node using BGP, including suspension of expiration of BGP sessions for lack of keepalive messages; receiving a BGP resume message from the mobile node, wherein the resume message comprises a checkpoint marker that identifies a last route update that the mobile node received before the suspending; resuming interaction with the mobile node using BGP; and determining and sending to the mobile node all BGP routes that originated after the checkpoint marker.

32 Claims, 10 Drawing Sheets

| ROUTER | CHECKPOINT |
|--------|------------|
| 102 | 5 |
| 103 | 8 |
| 104 | 107 |
| ⋮ | ⋮ |
| 202 CHECKPOINTED ROUTES | |
| 204 ADV_SEQ | 206 ACK_SEQ |

*Fig. 2*

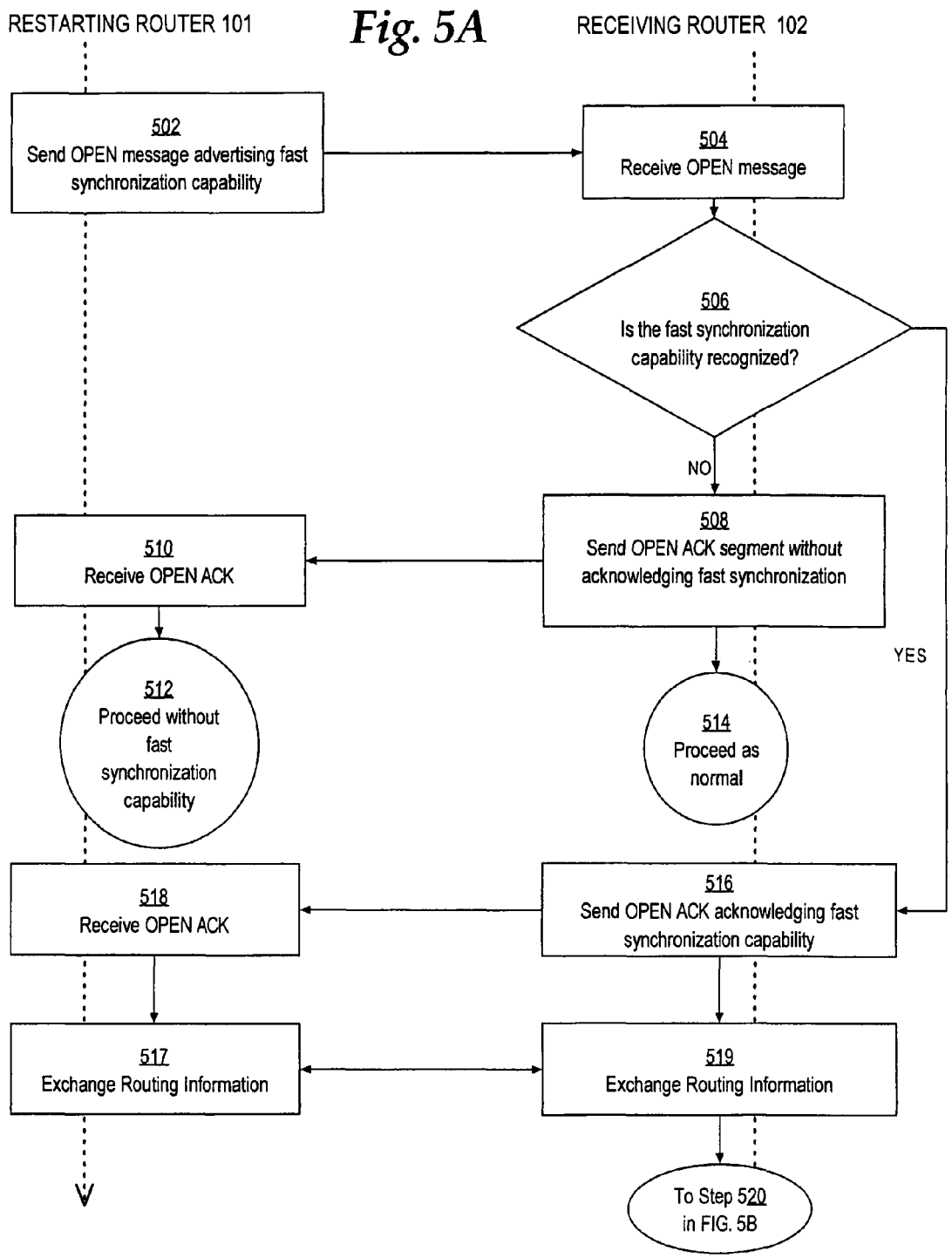

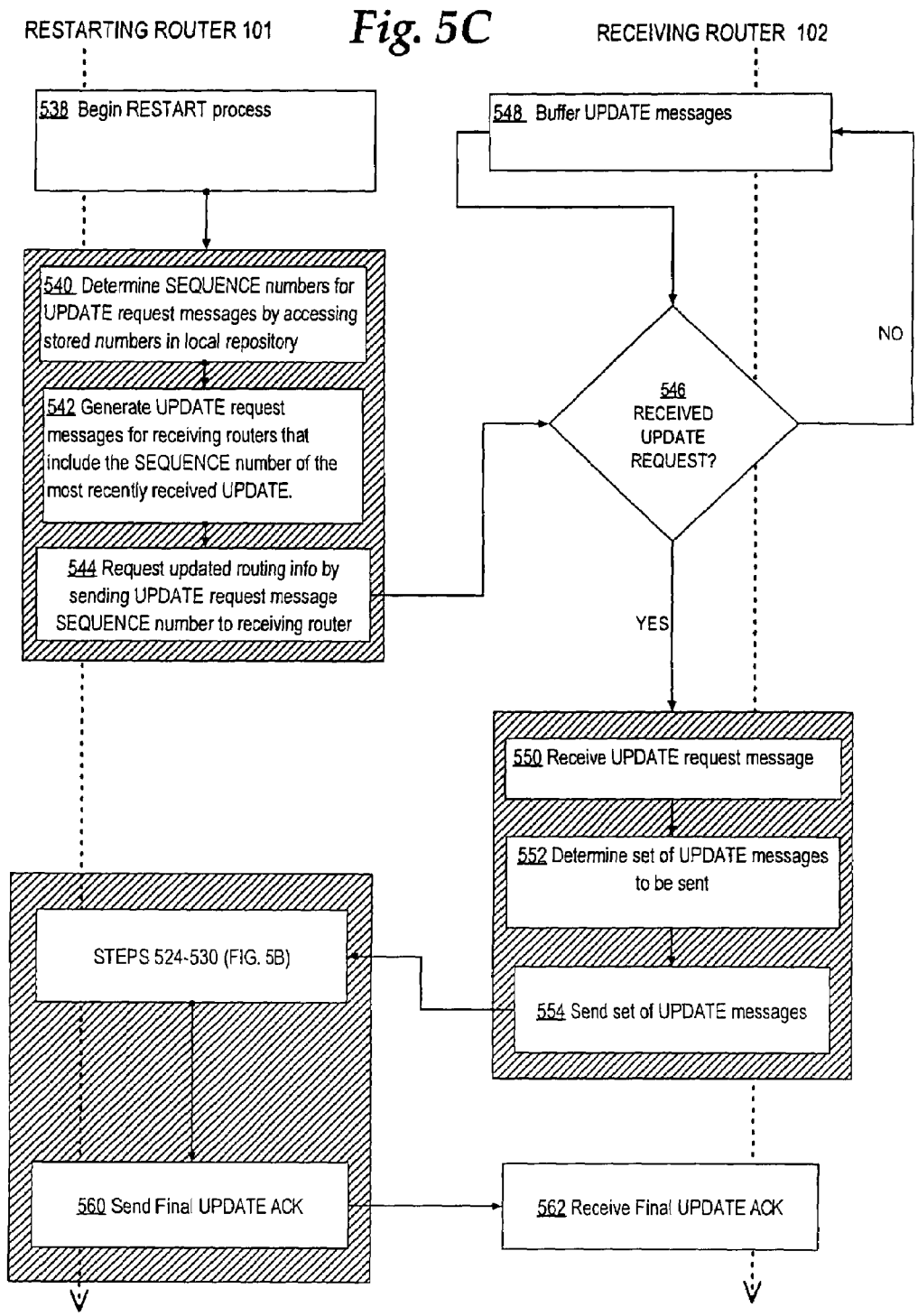

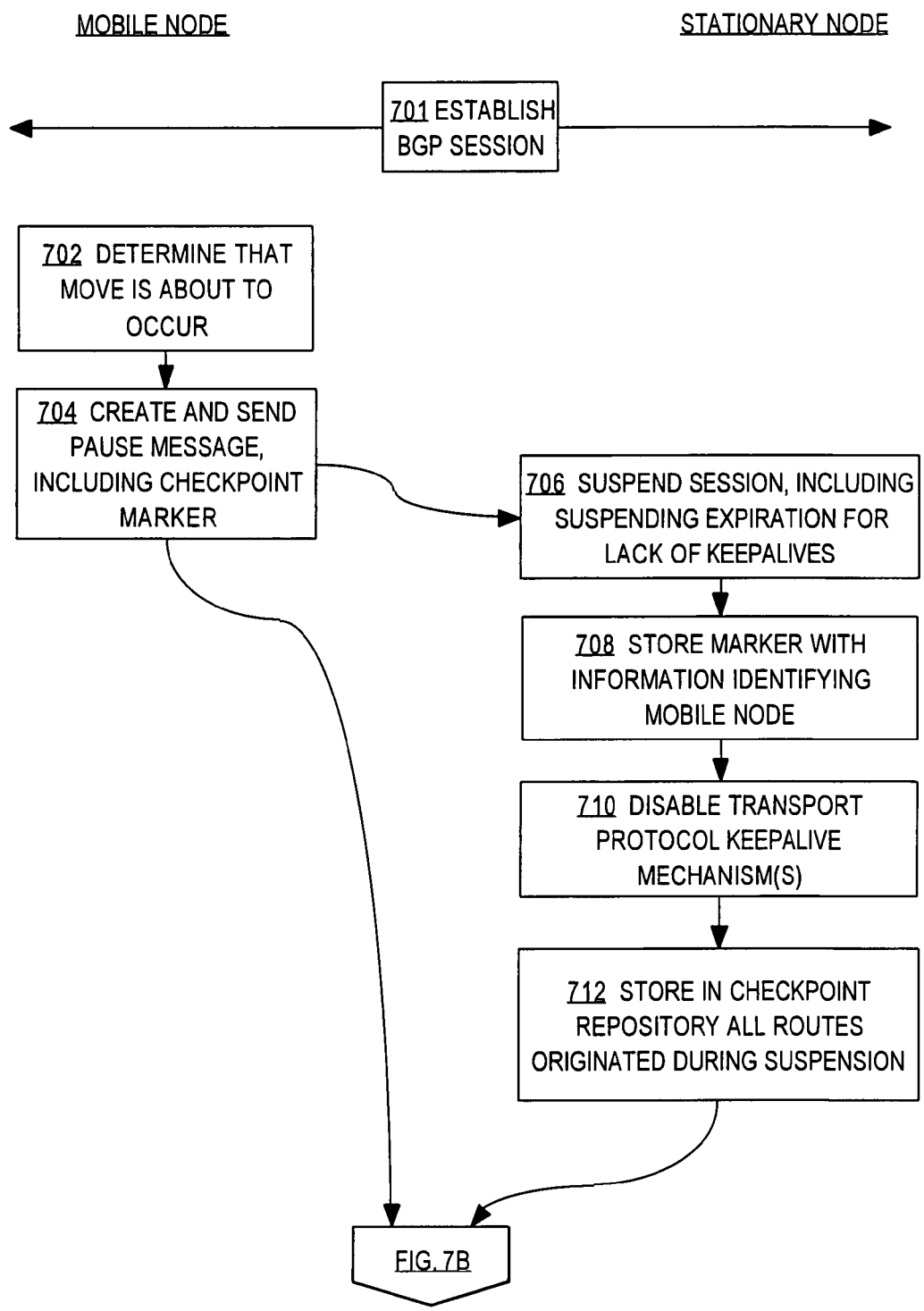

SUSPENDING OPERATION OF BORDER GATEWAY PROTOCOL

PRIORITY CLAIM; CROSS-REFERENCE TO RELATED APPLICATION

This application claims priority under 35 U.S.C. 120 as a Continuation of prior application Ser. No. 11/581,063, filed Oct. 13, 2006, the entire contents of which is hereby incorporated by reference for all purposes as if fully set forth herein.

FIELD OF THE INVENTION

The present invention relates to network routing protocols. More specifically, the invention relates to re-synchronizing routing information after restarting a network device.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

I. Border Gateway Protocol

Border Gateway Protocol (BGP) is an exterior gateway protocol (EGP) that is used to exchange routing information among network elements (usually routers) in autonomous systems and networks. A network element that executes a BGP process is typically referred to as a BGP host or a BGP speaker.

In order to exchange BGP routing information, BGP speakers exchange initial messages to establish a transport protocol connection with one another and to open a BGP session. Once a BGP session is open, a BGP speaker and its peers exchange routing information. During the initial connection setup, the BGP speakers exchange all the routing information that each one maintains, possibly limited according to policy filters. The routing information sent from a BGP speaker includes the complete routing information to each network destination reachable from the BGP speaker. Typically, the routing information includes the address prefix of the destination location (also referred to as a "prefix") and the attributes that describe the path to the destination host. At each host, the routing information is stored in a Routing Information Base ("RIB"). Generally, a BGP RIB is implemented as a single physical routing table.

Once the initial setup has been made, updates to the routing information are exchanged, or advertised, between peers for the remainder of the session.

During the initial setup of a BGP session, the amount of data exchanged between peer speakers can be significant, especially on larger networks. Hence, the amount of computing, bandwidth and network resource overhead to set up a BGP session may be very significant.

After a BGP session has been established, if a router participating in the session restarts or otherwise stops participating in the session, then the other router which was participating in the session (the "peer") will purge from its RIB all routes that were advertised as reachable by the unavailable router. When the BGP host becomes available again, every BGP speaker with which it communicates, or "peers", has to exchange routing information and recreate routing tables as if the BGP host is a brand new entity to the network. During the time required to perform such an exchange and re-create the tables ("re-convergence time"), a particular BGP host may be unable to forward data to peers on the previously unavailable routes. Since BGP is often deployed at WAN edges, the effect of an unavailable BGP host can propagate across multiple networks, disrupting more than one domain and one network.

Under these circumstances, the process of re-converging routing table information is time-consuming. In addition, the amount of computing resources and the consumption of network bandwidth required to resynchronize routing information can degrade network performance. In some cases, it may even cause temporary outages of services.

Accordingly, some techniques have been introduced to reduce this problem. Graceful Restart is one such behavior added to BGP to improve re-convergence issues after a BGP host restarts.

II. Graceful Restart

Graceful Restart ("GR") logic can reduce the duration and effect of outages associated with a failed BGP process. GR is defined in an IETF INTERNET DRAFT entitled "Graceful Restart Mechanism for BGP". To reduce the effect of outages associated with a failed BGP process, GR behavior is incorporated on a BGP host and its peers. When an initial BGP connection is established, both the restarting router and its peers exchange messages indicating that they support GR capability. The restarting router and its peers exchange capability negotiation messages including the BGP capability code "64," which notifies peers that the sending BGP speaker understands GR.

GR logic prevents BGP speakers from immediately purging routing information from their tables when a peer becomes unavailable. Instead, under GR logic the peer speakers hold routes associated with the restarting speaker in a "stale" state for a negotiated timeframe. In addition, with GR logic a restarting BGP speaker informs its peers that the restarting speaker is still in a forwarding state and, hence, the restarting speaker can continue to receive and forward packets.

Thus, when a restarting speaker restarts and opens a new BGP session, the restarting speaker sends messages with flags set that notify its peers that the BGP process with extended GR capabilities has restarted. As a result, the peer speakers send all their routing information and updates to the restarting speaker.

The restarting speaker determines that it has finished receiving updates from a peer when it receives an End-of-RIB ("EOR") marker. Typically, the EOR marker is an empty BGP update message. The restarting speaker then begins best-path selection using the new routing information. Once the restarting speaker has recomputed its routing tables, the restarting speaker sends updates to its peers. The peers recalculate their routing tables, send updates, etc. This process continues until the network has re-converged. Notably, with GR forwarding is not impacted during re-convergence, and peers not in direct communication with the failed router are not affected by the re-convergence.

Although GR improves re-convergence time, resynchronization of routing information still takes too long and consumes too many resources to be effective in certain situations. For example, in military and mobile situations, the exchange of routing information should consume as little bandwidth as possible. Yet, after a restart, peers still send all their routing information to the restarting speaker regardless of what has taken place during the restart process and regardless of what routing information the restarting speaker already holds.

For example, a restarting speaker may come back online before any changes have been made to any peer routing tables. Under GR, the restarting speaker is still flooded by routing update messages once it comes online. As another example, assume only a few changes have been made to peer routing information. When the restarting router comes back online, again, the restarting speaker is flooded by routing update messages from its peers even though there have been few changes. Accordingly, one of the main drawbacks to GR is that peers exchange non-essential and redundant information.

BGP is also sometimes used with mobile packet routing devices that communicate using wireless links. For example, some military organizations use routers in field environments in which the routers are periodically moved to different locations. Such moves can result in one mobile router temporarily losing connectivity to a peer, which may be stationary or mobile. Normally, under BGP and TCP a loss of connectivity results in tearing down a BGP session and terminating the underlying TCP connection. However, in such mobile applications, conservation of resources such as CPU use, network bandwidth, and power are important. The processing overhead of setting up and tearing down BGP sessions and TCP connections among mobile devices is considered costly. Therefore, a need exists for a way to minimize the use of resources when mobile devices are moved and lose connectivity.

Further, in such mobile applications, a need sometimes exists to temporarily cease wireless network communications among the mobile devices. Temporarily ceasing communications may be termed "radio silence" or operating in "covert mode." In such a mode, a mobile device can receive data relating to BGP sessions and TCP connections wirelessly, or receive other data for command and control functions, but cannot transmit data, which would result in emitting radio-frequency energy. There is a need for mobile devices to run protocols such as BGP and TCP while accommodating periods of "radio silence" or "covert mode," without tearing down the BGP sessions or TCP connections.

BRIEF DESCRIPTION OF THE DRAWINGS

The present invention is illustrated by way of example, and not by way of limitation, in the figures of the accompanying drawings.

FIG. 2 illustrates an example entry for maintaining checkpoint marker information in a repository on a fast synchronization capable networking device.

FIG. 5A is a flow diagram that illustrates a high level overview of one embodiment of a method for establishing a connection between networking devices in a fast synchronization environment.

FIG. 5C is a continuation of the flow diagram in FIG. 5A and 5B, and illustrates an overview of a method for requesting and receiving update messages after a networking device restarts in a fast synchronization environment.

FIG. 7A is a flow diagram of steps in an example process of pausing and resuming a session;

DETAILED DESCRIPTION

Figure 1:
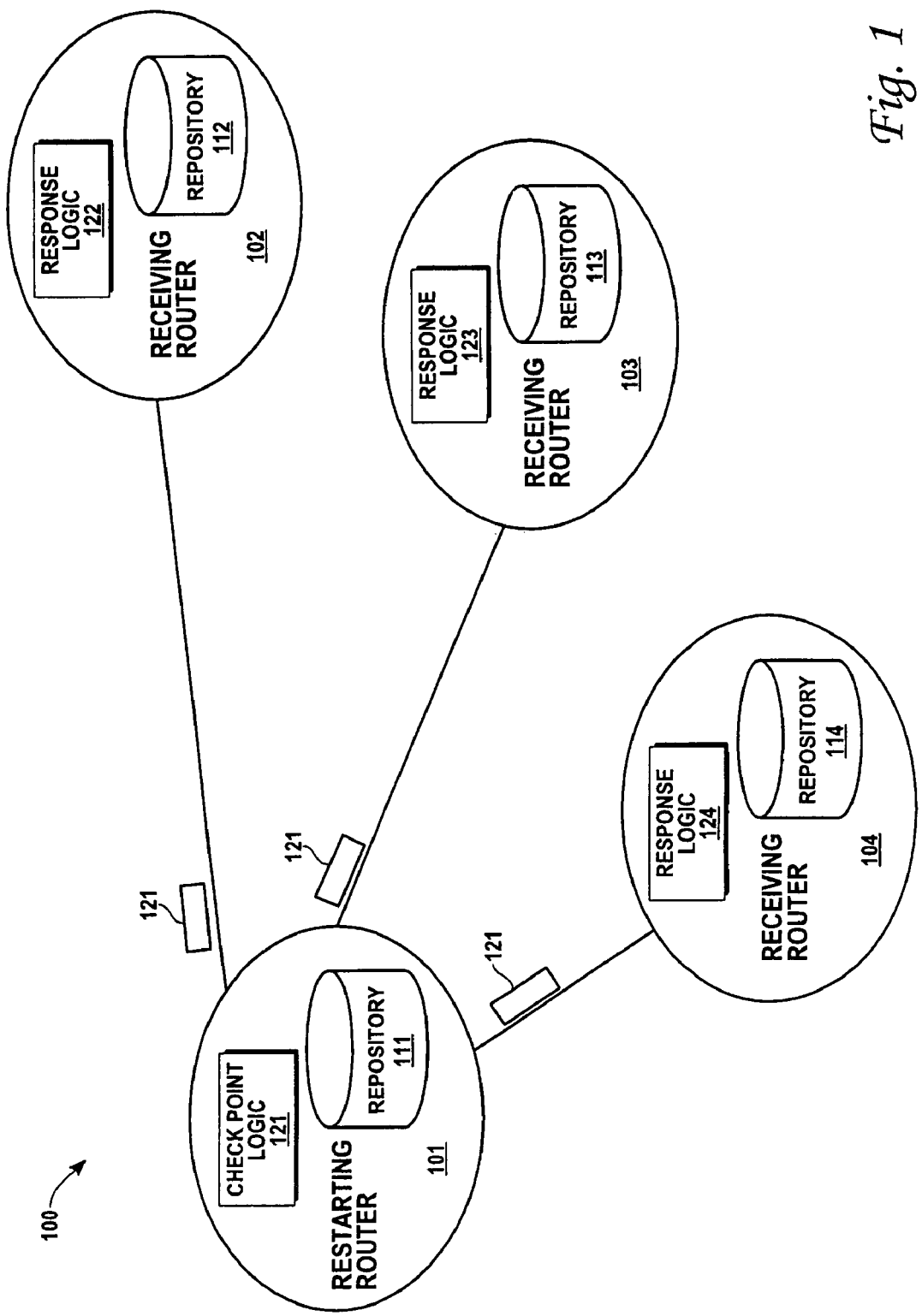
FIG. 1 illustrates a block diagram of a system providing fast synchronization capabilities.

Techniques for fast BGP synchronization are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following general outline:

I. OVERVIEW
      A. GENERAL OVERVIEW
      B. NETWORK ENVIRONMENT FOR FAST SYNCHRONIZATION
      C. FUNCTIONAL OVERVIEW
   II. FAST BGP SYNCHRONIZATION APPROACH
      A. ESTABLISHING FAST SYNCHRONIZATION CAPABILITY
      B. SENDING UPDATE MESSAGES AND ESTABLISHING CHECKPOINTS
         1. UPDATE MESSAGES
         2. CHECKPOINT MARKER ATTRIBUTE
         3. ADVERTISE SEQUENCE FIELD
         4. ACKNOWLEDGE SEQUENCE VALUE
   III. RESTARTING A SPEAKER USING A FAST SYNCHRONIZATION APPROACH
      A. ESTABLISH A FAST SYNCHRONIZATION CONNECTION
      B. SEND AND RECEIVE UPDATE MESSAGES DURING NORMAL OPERATION
      C. REQUEST UPDATE MESSAGES AFTER A RESTART
         1. RECEIVING SPEAKER
         2. RESTARTING SPEAKER
   IV. PAUSING AND RESUMING SESSIONS
   V. HARDWARE OVERVIEW
   VI. EXTENSIONS AND ALTERNATIVES

I. Overview

A. General Overview

The techniques described herein reduce the negative effects on routing caused by a restart event. For example, the techniques herein can advertise a network device's fast synchronization capability and establish checkpoints based on sequencing information extracted from routing messages.

In one embodiment, a network host's fast synchronization capability is advertised at the time that a connection is established. By advertising the host's fast synchronization capability, the host notifies peer devices that the host supports fast synchronization. Then as routing messages are exchanged between the host and peers of the host, the host extracts information from the messages; the extracted information is used to establish one or more checkpoints. After a restart event, the stored checkpoints include enough information to allow the network host to notify its peer devices at what point it stopped receiving updated routing information. The peer network devices then use the checkpoint information to identify selected updates or routes for retransmission to the restarted host.

For example, in one embodiment, a BGP speaker stores routing information. When the BGP speaker establishes BGP peering sessions with one or more BGP peers, the BGP speaker advertises the fact that it supports fast synchronization to the peers. Then, as the BGP speaker and peers with fast synchronization capability exchange routing information, the BGP speaker extracts sequencing information from the update messages it receives. Using the sequencing information, the BGP speaker creates and stores checkpoints to indicate all routing information received from the peer. After a restart, the BGP speaker sends a request for updated information to its peers. In each request, the restarted BGP speaker includes the extracted sequencing information that indicates the last message the speaker received. The peer speakers receive the request and, based on the sequencing information in the request, send update messages only for route updates that have occurred after the last message indicated in the sequencing information.

The techniques described herein expedite re-convergence of routing information. Moreover, the techniques accommodate a variety of implementations. For example, an optional acknowledgement mechanism allows a speaker to deterministically inform a peer up to what point received information has been processed.

Furthermore, the techniques herein apply to a wide range of network devices. Applicable devices include devices that have the ability to preserve forwarding state during a restart and devices that cannot preserve forwarding state. Applicable devices include, for example, routers, switches, and other networking devices. Some implementations implement a subset of the techniques described in this document.

For purposes of illustrating clear examples, the techniques described herein refer to BGP. However, BGP is described merely as an example. Alternative implementations may be used with other routing protocols and in other environments.

B. Network Environment for Fast Synchronization

FIG. 1 illustrates an example network environment 100 in which embodiments may be implemented. In FIG. 1, restarting router 101 is a network device implementing fast synchronization techniques as described herein. Receiving routers 102, 103 and 104 are also network devices capable of maintaining, forwarding and receiving network routing information. Each of the routers 102, 103, and 104 is communicatively coupled to restarting router 101 directly or indirectly through one or more links, networks, internetworks, or other routers. Each of the routers 102, 103, and 104 is a peer to restarting router 101 and each has fast synchronization capability.

In one embodiment, all of routers 101, 102, 103, 104 host an executable module that implements BGP, and all are within the same BGP autonomous system. In the same or other embodiments, the routers include Graceful Restart ("GR") capability. Alternatively, different protocols and capabilities may be used.

In FIG. 1, restarting router 101 includes a repository 111. Repository 111 maintains checkpointed routes and a checkpoint marker value for each peer router 102, 103, and 104. Repository 111 may be a table, database, or other structure capable of maintaining state information about peers of restarting router 101. Receiving routers 102, 103, and 104 also maintain repositories 112, 113, and 114 respectively. Repositories 112, 113, 114 also maintain checkpointed routes and checkpoint markers about peers of routers 102, 103, 104, respectively.

The structure and content of the checkpoint markers that are maintained by each of the routers 101-104 may vary. For example, a checkpoint marker may include sequencing information as described herein to identify a checkpoint marker. Each checkpoint marker value is sent in a BGP update message, is extracted from the message, and is stored in a repository of a receiving router. Checkpointed routes comprise routes that have been received in a conventional BGP UPDATE message and stored in a repository so that the checkpointed routes can be quickly retrieved after a restart.

FIG. 2 illustrates an example checkpoint repository 200. In FIG. 2, repository 200 comprises a table that associates peer router identification numbers and a checkpoint marker value for each peer. For example, repository 200 for router 101 includes a row for each peer router 102, 103, 104. Each row includes a column with a router identifier (102, 103, 104 in FIG. 2) and checkpoint marker value (5, 8, 107 in FIG. 2). The checkpoint marker values identify a sequence number for the most recently received update message from the peer indicated by the router identifier. For purposes of illustrating a clear example, FIG. 2 uses whole integers as router identifiers and checkpoint marker values; however, alternative embodiments may use any useful numbering or labeling scheme. For example, in various embodiments, the checkpoint marker information may be a time stamp, an update message, a hash code, etc.

Repository 200 further includes one or more checkpointed routes 202. In an embodiment, routes are stored in the checkpoint repository sequentially as they are received. In this context, storing routes sequentially may comprise checkpointing each route as it is received, and performing the checkpointing in the order that routes are received. Alternatively, storing routes sequentially may comprise storing the routes in the checkpoint in FIFO order. An embodiment may use either alternative. The repository may comprise a database or any other suitable store.

Storing checkpointed routes 202 in a persistent store enables a restarting router to rapidly retrieve the checkpointed routes after a restart event. Consequently, the restarting router does not have to re-request the checkpointed routes from peer routers, and therefore convergence time is reduced.

A router also stores an advertised sequence number ("ADV_SEQ") 204 and an acknowledged sequence number ("ACK_SEQ") 206, either in repository 200 as shown in FIG. 2, or in other storage. Generally, the ADV_SEQ value 204 is a value that allows a sending BGP speaker to identify which UPDATE messages have not yet been acknowledged. The ACK_SEQ value 206 is used by a BGP speaker to inform a peer of which routes the speaker has checkpointed in the repository. The use of the ADV_SEQ value 204 and ACK_SEQ value 206 are described further below.

In one embodiment, the checkpoint marker information is maintained in a repository that is separate from the RIB. Alternatively, the RIB is used to help maintain checkpoint and update information. For example, table 200 may form part of the RIB.

C. Functional Overview

The approach herein provides methods for rapidly communicating routes after a router, switch or other BGP peer restarts or recovers from a fault. As an example of operation under the approach herein, referring again to FIG. 1, assume, for example, on a restart that restarting router 101 accesses repository 111, and that the repository is structured as in FIG. 2. The restarting router 101 retrieves all checkpointed routes 202 from the repository 200 and installs the retrieved routes in its RIB. To achieve convergence, the restarting router 101 now needs to request and receive only unacknowledged, non-checkpointed routes from its peers. Using checkpoint logic 121, restarting router 101 extracts the appropriate checkpoint marker for each of its peer routers 102, 103, 104 from table 200 of repository 111, inserts the checkpoint marker into an update request message, and sends the update request messages to routers 102, 103, and 104. The message sent to each receiving router contains only the respective checkpoint marker for that receiving router. Based on the checkpoint marker in the message, receiving routers 102, 103, and 104 determine what update information the restarting router currently holds and calculate which update messages have not yet been sent to restarting router 101.

In one embodiment, receiving routers 102, 103, and 104 are configured with checkpoint marker response logic 122, 123, and 124 that extracts a checkpoint marker from a request message and generates one or more update messages to send to restarting router 101. In one implementation, the checkpoint marker response logic includes update message buffers. In other embodiments, routing information is time stamped. Hence, updates are sent by walking through the route entries stored in receiving routers and forwarding only routes for those entries that have a timestamp later than the timestamp indicated by the restarting router as a checkpoint marker in a request message. In yet other embodiments, each entry in a receiving router's RIB stores a sequence number that indicates which update message is associated with that entry. Entries with a sequence number after the checkpoint marker value are sent to the restarting router.

Various embodiments are implemented in connection with GR because GR has built in to it many features that facilitate the process of fast synchronization. For example, in GR when restarting router 101 goes offline, receiving routers 102, 103, and 104 understand that the restarting router remains in a forwarding state in which the restarting routing continues to forward messages to the extent possible. Moreover, in GR, receiving routers 102, 103, and 104 merely mark routes associated with restarting router 101 as stale, instead of purging the routes when the restarting router becomes unavailable. Thus, logic implementing GR provides that certain routing tables and other forms of data should be maintained during a restart. GR is not necessary to an embodiment, but GR logic provides a well-known framework for implementing embodiments.

Accordingly, a fast synchronization approach as described herein has several features. A first feature involves establishing that a network device has fast synchronization capability. A second feature involves exchanging update messages with checkpoint marker information. A third feature involves quickly re-synchronizing routing information, based on the checkpoint marker information, after a network device restarts. Each feature is now described in further detail.

II. Fast BGP Synchronization Approach

A. Establishing Fast Synchronization Capability

Capability negotiation for fast synchronization as described herein is a network routing capability that a network host may use to indicate its ability to preserve and quickly recover a forwarding state after a restart. A capability negotiation indicating fast synchronization also may be used to convey to network peers the capability of generating and sending checkpoint markers.

Upon startup, in one embodiment, a network device implementing fast synchronization techniques as described herein sends a message advertising fast synchronization capability to its peers. By sending such a message, a network device indicates its ability to properly send, interpret and respond to update messages containing checkpoint markers.

When a restarting router, such as restarting router 101 in FIG. 1, is first initialized, as well as on subsequent restarts, the restarting router sends an open connection message that indicates that the restarting router includes fast synchronization capability. The capability may be indicated by a code value in the open connection message. In one embodiment, the open message is a BGP OPEN message.

Figure 3:
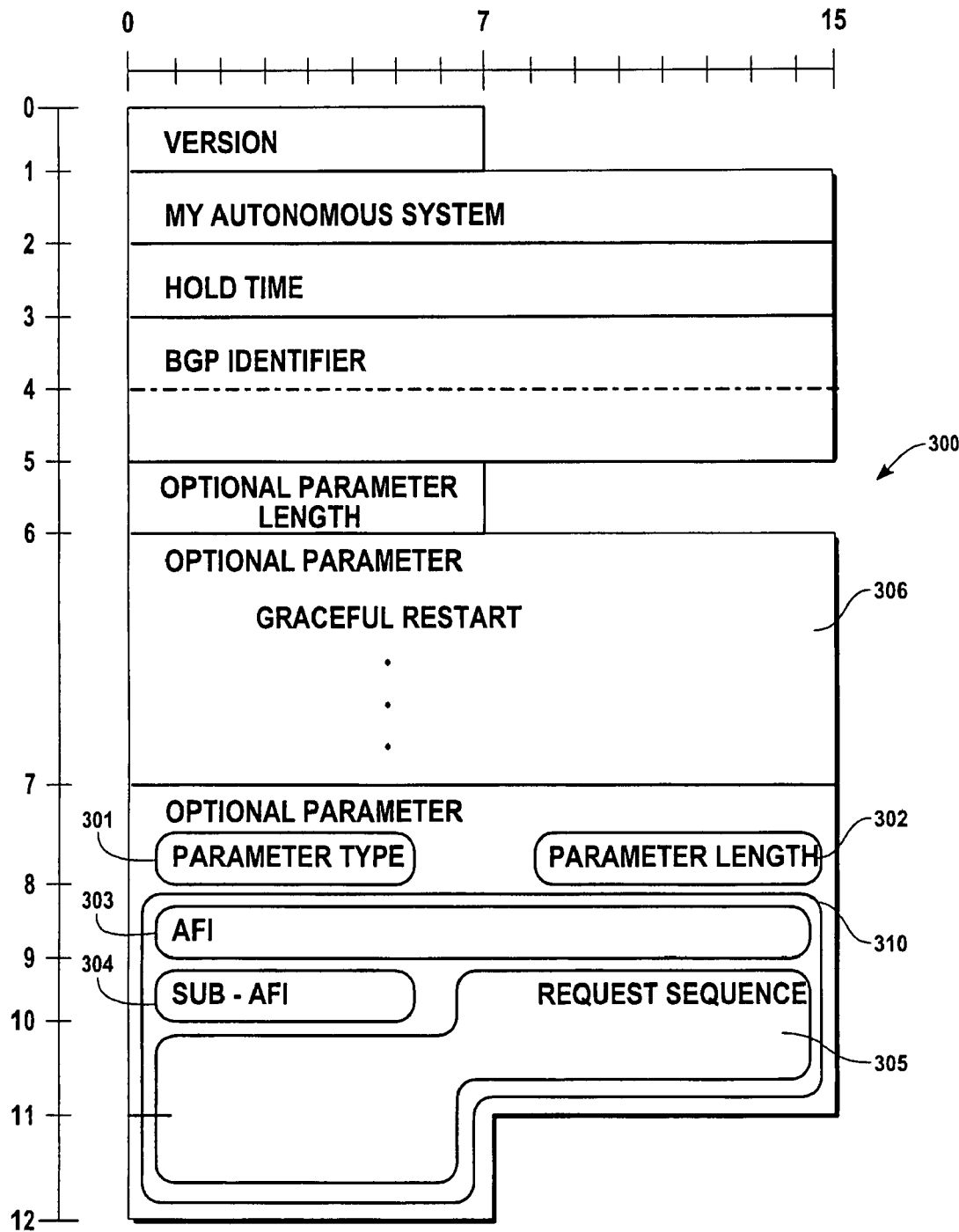
FIG. 3 illustrates an example message format for announcing a networking device has fast synchronization capabilities.

FIG. 3 illustrates an example message 300 for establishing fast synchronization capability. The message 300 is a BGP OPEN message that comprises a "Parameter Type Code" field 301 to indicate the capability to perform fast synchronization, a "Capability Length" field 302 to indicate the total length of the fast synchronization parameters, and a "Parameter Value-" field 310. Other optional parameters such as GR parameters 306 may also be included in the message. Message 300 may further comprise an AFI field 303, sub-AFI field 304, a request sequence field 305, a version field, autonomous system identifier field, hold time field, and BGP identifier field structured in conventional format for a BGP OPEN message. Such fields are not affected by the present approach and therefore such fields are not described in detail herein.

In one embodiment, Parameter Type Code field 301 includes a one-byte value that indicates to a peer speaker that a BGP speaker has fast synchronization capability. In one embodiment, the value stored in the Parameter Type Code field 301 is agreed upon among routers and other networking devices that use BGP. For example, a value of 127 may be used to indicate fast synchronization capability. Alternatively, a different value, such 5 or 102, may be used. In some embodiments, the value of field 301 varies based on specific implementation details, such as type of router, protocol, and manufacturer-specific implementation issues.

In one embodiment, Parameter Length field 302 indicates to peer routers the number of subsequent bytes in the message 300 that pertain to the particular capability identified in the Parameter Type Code field 301. For example, the Parameter Length field 302 is one byte carrying a numeric value. If the value of the Parameter Length field is "4", then the length of the subsequent Parameter Value field 310 is four bytes and occupies the next four bytes of message 300. The value of Parameter Length field 302 varies based on the length of the Parameter Value field 310 in the message. As described below, several factors affect the length of Parameter Value field 310.

In a BGP OPEN message, Parameter Value field 310 includes information necessary to request update messages when a restarting router initializes or restarts. The Parameter Value field 310 typically contains one or more tuples containing an Address Family Identifier (AFI) field 303, a Subsequent Address Family Identifier (SAFI) field 304, and a Request Sequence field 305. The AFI and SAFI fields are well defined in BGP and GR, and identify routes to which the associated Request Sequence field 305 applies. The value of Parameter Length field 302 varies based on the number of such tuples.

In an embodiment, each Request Sequence field 305 in the one or more tuples includes checkpoint marker values that a restarting router sends to receiving routers upon a restart event. Based on the checkpoint marker, receiving routers determine which updates from its routing tables should be sent to the restarting router.

In one embodiment, on initial startup, the value of Request Sequence field 305 is 0. The zero value instructs other routers to send their entire routing tables as updates to the restarting router. In other embodiments, the value of Request Sequence 305 field is a checkpoint marker value. The checkpoint marker value may be an Advertised Sequence value as described below.

B. Sending Update Messages and Establishing Checkpoints

Upon receiving a BGP OPEN message from a peer that advertises a particular capability of the peer, a receiving BGP speaker stores information about the capability in association with information identifying the peer. Once routers have established their ability to support fast synchronization, update messages are sent back and forth between peers. When a BGP speaker is sending an UPDATE message to a peer that is known, from the prior capability exchange, to support fast synchronization as described herein, then the UPDATE messages include both routing information and checkpoint marker information. In one embodiment, a BGP speaker manages a RIB that includes a section called the Adj-RIBs-Out. This section of the RIB stores the information that a local BGP speaker has selected for advertisement to its peers. Update messages advertised to peer BGP speakers include the routing information stored in the Adj-RIBs-Out. When an update message is received, the routing information from the update message is added to the receiving router's RIB in a conventional manner, as well as being checkpointed as previously discussed. In an embodiment, after the received routing information is acknowledged, the value of the checkpoint marker for the sending peer is also updated in the receiving router's repository (e.g., repository 111 in FIG. 1).

1. Update Messages

BGP UPDATE messages provide a mechanism to carry route checkpoint advertisement and acknowledgment information for later use in resynchronization after a BGP speaker restarts.

Figure 4:
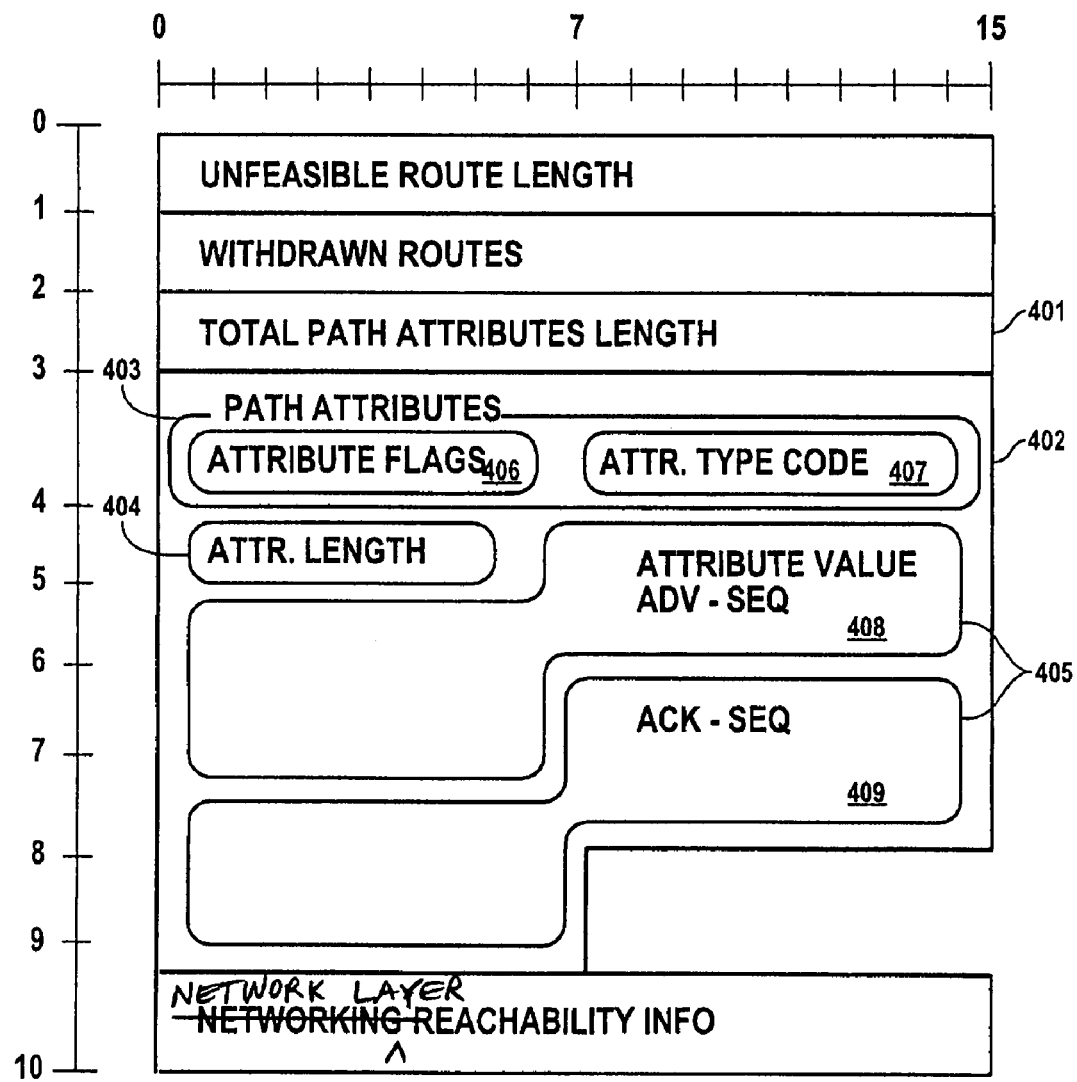
FIG. 4 illustrates an example message format for providing checkpoint marker information to peer networking device that have fast synchronization capabilities.

FIG. 4 illustrates an example update message 400 for sending routing information and checkpoint marker information. In one embodiment, update message 400 is a BGP UPDATE message that includes "unfeasible route length" field, "withdrawn routes" field, and "network layer reachability information" field. The form and content of such fields are well known and are not discussed herein. UPDATE message 400 further comprises a Path Attributes field 402 that is configured to carry checkpoint markers, as now described.

2. Checkpoint Marker Attribute

In one embodiment, the Path Attributes field 402 is extended to include checkpoint marker information. In this configuration, the UPDATE messages 400 enhance networking devices' ability to quickly re-converge after a restart. Routers implementing fast synchronization obtain checkpoint marker values from Path Attributes field 402 to identify checkpoint markers associated with routes or groups of routes that have been checkpointed.

In one embodiment, UPDATE message 400 comprises a "Total Path Attribute Length" field 401 and "Path Attributes" field 402. In one embodiment, the Total Path Attribute Length field 401 comprises a two-byte unsigned integer that indicates the total length in bytes of the Path Attributes field 402. The Path Attributes field 402 is a variable-length sequence of checkpoint marker information. The length of the Path Attributes field 402 varies based on the type of checkpoint marker value that is used, the number of routers and routes being updated, protocol, and other factors. As illustrated in FIG. 4, each value of Path Attribute field 402 comprises an "Attribute Type" field 403, an "Attribute Length" field 404, and an "Attribute Value" field 405.

The Attribute Type field is a two-byte field that contains an "Attribute Flags" field 406 and an "Attribute Type Code" field 407. Attribute Values 405 comprise checkpoint marker values and are interpreted according to the Attribute Flags 406 and the Attribute Type Code 407.

In one embodiment, Attribute Flags 406 indicate certain properties about the rest of the data in the Path Attributes field 402. For instance, Attribute Flags 406 indicate whether the values in Path Attribute fields 402 are optional or mandatory, whether the values are transitive or intransitive, and other such attributes. In one embodiment, one or more bits in Attribute Flags 406 are set to indicate that the checkpoint marker information is optional and non-transitive. In other embodiments, fast synchronization (and its checkpoint marker information) may be mandatory and/or transitive and bits in Attribute Flags 406 are set accordingly.

Attribute Code field 407 informs routers receiving UPDATE message 400 that the subsequent information stored in the Attribute Values 405 is associated with fast synchronization. The value of Attribute Code field 407 may vary based on network device manufacturer implementation, protocols involved, and other factors.

Attribute Length field 404 indicates the total length of Attribute Value field 405. In one embodiment, the value of Attribute Length field 404 is "8". In other embodiments, the Attribute Length value 404 is greater, or smaller.

In FIG. 4, Attribute Value field 405 contains checkpoint marker information. In one embodiment, the checkpoint marker information includes eight bytes of data in which four bytes include a checkpoint marker value in the form of Advertise Sequence number 408 and four bytes that include an Acknowledge Sequence number 409, which are described further below. In other embodiments, the Attribute Value field 405 includes more or less data and may be of a greater or smaller size. In one alternative embodiment, the update message does not include the field for acknowledging receipt of data.

3. Advertise Sequence Field

A sending router sets Advertise Sequence number 408 to a value that indicates which UPDATE messages the sending router has sent and have not yet been acknowledged. A peer may store a received Advertise Sequence number 408 in the router's repository 111 to indicate the last message received from the sending peer. With each update message, a router updates the checkpoint marker for the sending peer with the Advertise Sequence number 408, and checkpoints the received route, e.g., by storing the received route in repository 200. After a restart, the checkpoint markers and checkpointed routes allow a restarting router to rapidly install previously received routes, and to request route updates from receiving routers for only updates that have occurred since the checkpoint marker was set.

For example, when a router, such as router 101 in FIG. 1, receives a BGP UPDATE message 400, the router stores the Advertise Sequence field 408 as the checkpoint marker value for the sending peer and router identifying information into checkpoint repository 111. Router identifying information includes information such as an IP or other network address, MAC address, a hash code, or other information that identifies a router on the network.

After a restart, the restarting router 101 retrieves and installs the checkpointed routes, extracts the stored checkpoint value from its checkpoint repository 111, determines based on the checkpoint value which routes are needed from a particular peer, and sends a BGP OPEN message to the appropriate receiving router with information requesting only the needed routes. The particular structure of a request message for use after restart is described further below.

In one embodiment, the Advertise Sequence field 408 includes a sequence number or value that identifies a group of one or more UPDATE messages. In certain embodiments, the value of Advertise Sequence field 408 multiple contiguous update messages may be identified by the same Advertise Sequence value.

The particular format of the value stored in Advertise Sequence field 408 may vary in different implementations. For instance, a monotonically increasing value may be used. Alternatively, a time stamp, a reference number, or hash code may be used.

In one embodiment, a receiving router treats the format of the Advertise Sequence field 408 as opaque. In certain implementations, treating the Advertise Sequence field 408 as opaque is appropriate because the value stored in the field has no meaning except to the router that sent it. For instance, one router may use a time stamp as a sequence value. In such a case, a receiving router receives the messages, retrieves the Advertise Sequence value, and stores the value in its checkpoint repository. On a request for updates after a restart, the restarting router simply inserts the Advertise Sequence value into the appropriate update request message (e.g., OPEN message) and the receiving router interprets the sequence values according to its own algorithms. There is no need for a restarting router to interpret that value; the restarting router simply sends back what the restarting router previously received. Alternatively, at startup routers may negotiate a specific type of value, or a standardized format may be designated.

In one embodiment, the value of zero is reserved and is not used as an advertised sequence value, except as described herein in connection with request for all routing information. If a restarting router receives an update message with an Advertise Sequence value of zero (except when it is the first update message received), then the restarting router may terminate the connection and notify the receiving router that an error occurred. Alternatively, update messages received with no Advertise Sequence value are associated with the last update message (and Advertise Sequence value) received on that connection.

4. Acknowledge Sequence Value

Acknowledge Sequence number 409 acknowledges that a router received an update message with that particular sequence value and checkpointed the accompanying route information. In one embodiment, when a router receives a BGP UPDATE message 400 containing an Advertise Sequence value 408, the sequence value information from the Advertise Sequence field 408 is inserted into the router's checkpoint repository 111, and then the UPDATE message is acknowledged.

In an embodiment, a router does not individually acknowledge every update message or every route; only the most recent update message is acknowledged, because acknowledgement of the most recently advertised sequence value in effect acknowledges all previously received routes. For example, when a restarting router comes online, the restarting router may be flooded with routing and update messages. In this circumstance, responding to each update message consumes unnecessary bandwidth.

In one embodiment, when a receiving router fails to receive an acknowledgement message comprising an Acknowledge Sequence value 409, the receiving router starts buffering update messages. The rationale for buffering is that the restarting router may be temporarily offline. Alternatively, other mechanisms may be used in anticipation of an update request from the restarting router.

Generally, the Acknowledge Sequence value 409 replicates the Advertise Sequence value 408 of the last received update message, inserts the value into the Acknowledge Sequence field, and then sends the message back to the sending router. When an Acknowledge Sequence value 409 is sent, the Attribute Type Code 407 may be set to a new value to indicate that the update message is an acknowledgement message.

In one embodiment, multiple acknowledgements may be coalesced into one acknowledgement message. For example, when an update message is sent and its Advertise Sequence value has not changed, the Attribute Type Code 407 does not need to be set. The restarting router processes the received update message as a duplicate of a previous message or as a continuation of a previously sent update message including more updated routes. If the Advertise Sequence value or Acknowledge Sequence value changes then the Attribute Type Code 407 is modified to notify a restarting router and receiving routers of the change in message format. When the Advertise Sequence value or Acknowledge Sequence value changes, the other stored checkpoints also change to store the new checkpoint marker information.

Generally, receiving the same update message more than once is permitted if correct ordering is preserved. For instance, in a recovery situation, a restarting router may re-receive some routes it has previously received and checkpointed. The restarting router may ignore duplicate update messages. Alternatively, the restarting router processes the duplicate update messages in order.

In one BGP embodiment having GR capabilities, an UPDATE message including an Advertise Sequence value, but no other information, is interpreted as an End-of-RIB marker. A BGP speaker can use the End-of-RIB marker to indicate to its peer the completion of the initial routing update after a BGP session is established.

Various embodiments may implement exceptions to the general advertise-acknowledge framework described above. For example, a BGP speaker may be configured, such as by filters, to never send routes to its peers. In such a case, the BGP speaker does not send update messages containing its own advertised routes. However, the BGP speaker should acknowledge received routes and store checkpoint marker information like any other speaker.

Another exception relates to a peer device that has not advertised fast synchronization capability. In such a case, if the Advertise Sequence value is set when the peer device sends an update message, then the Advertise Sequence value is ignored by other routers on the network and the value is not acknowledged. For instance, a BGP-based network may include route reflectors without fast synchronization capability that do not send an open message announcing fast synchronization capability.

If a route reflector does advertise the fast synchronization capability, the route reflector behaves like any other router described herein.

In some embodiments, acknowledgement messages are not sent in response to update messages. In one embodiment, to reduce traffic across a network, when an update message is sent, the sending router assumes the message arrives safely at its destination. When a router restarts, a fast synchronization request message is sent. To respond to the request, receiving routers store additional information, such as the Advertise Sequence value, with each route entry in the receiving router's RIB.

Thus, when a fast synchronization update request message is received, the receiving router walks through its RIB and finds routes associated with an Advertise Sequence value greater than the value contained in the update request message. The receiving router sends update messages only for those routes. This approach balances the additional storage overhead needed to maintain the Advertise Sequence value for each route against the amount of network bandwidth associated with acknowledgement messages.

Alternatively, to reduce buffer requirements, a receiving router stores Acknowledge Sequence values. For example, assume in a receiving router, each route is stored in a table with an associated Advertise Sequence number. When an update acknowledgement message is received, the receiving router stores the Acknowledge Sequence value. Thus, when a subsequent fast synchronization update request message is received, the receiving router retrieves the most recently received Acknowledge Sequence value, and walks through its route table, comparing the Acknowledge Sequence value to the stored Advertise Sequence value for each route. Any route with an Advertise Sequence value greater than the Acknowledge value is sent in an update message. This approach reduces the need to buffer update messages, but increases the storage requirement for each entry in the RIB. However, only the most recently received acknowledgement message is maintained at a receiving router. Alternatively, instead of storing the most recent Acknowledge Sequence value, the receiving router merely increments the Advertise Sequence value included in the fast synchronization update request message.

III. Restarting a Speaker Using a Fast Synchronization Approach

Figure 5B:
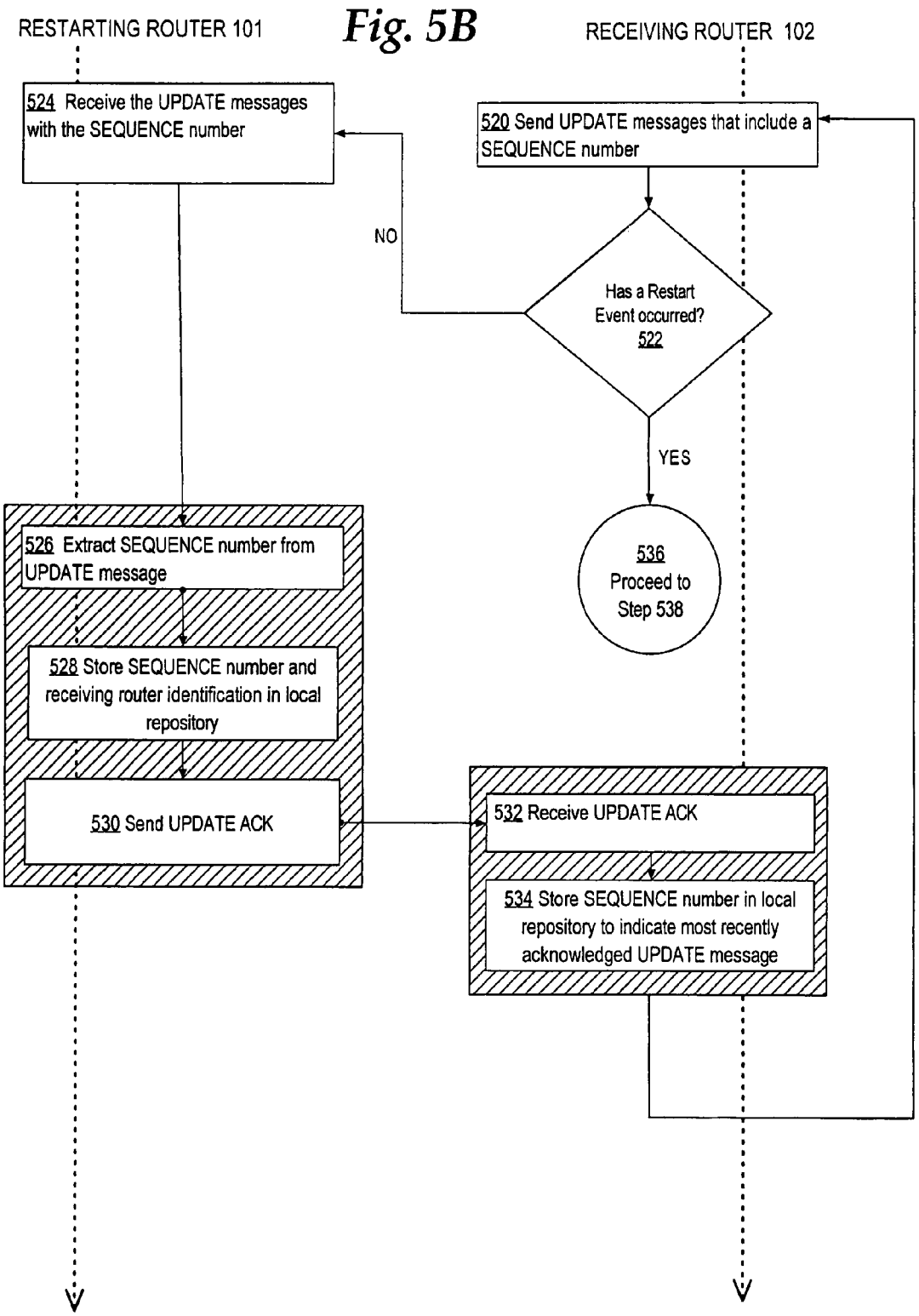
FIG. 5B is a continuation of the flow diagram in FIG. 5A and illustrates an overview of a method for forwarding update messages with checkpoint marker information between networking devices

FIGS. 5A-5C illustrate an overview of a method for restarting a speaker using fast synchronization. A restarting speaker establishes a connection with peer speakers, communicates routing information updates with the peer speakers, and, upon a restart event, uses fast synchronization update request messages to quickly resynchronize routing information.

A. Establish a Fast Synchronization Connection

FIG. 5A is a flow diagram that illustrates an overview of a method for establishing a connection with fast synchronization capabilities as described herein.

In one embodiment, a restarting speaker, such as the restarting router 101 in FIG. 1, sends an open connection message (e.g., a BGP OPEN message as described above) at step 502. The open connection message advertises the restarting speaker's fast synchronization capabilities to peer networking devices (e.g., receiving speakers). In one instance, the receiving speaker is a receiving router, such as receiving router 102 described in connection with FIG. 1. At step 504, the receiving router 102 stores the capability information for restarting router 101, indicating fast synchronization capability, in association with information identifying the restarting router 101. In step 506, the receiving router 102 also may send an OPEN message that advertises fast synchronization capability, and restarting router 101 stores the capability for that router in step 508. Accordingly, the restarting router and receiving router have established a communications session with fast synchronization capability.

At step 517, 519, the restarting speaker and the receiving speaker exchange initial routing information. Once, the initial routing information exchange has completed, the restarting speaker and the receiving speaker begin exchanging update messages.

B. Send and Receive Update Messages During Normal Operation

FIG. 5B is a continuation flow diagram that illustrates the method for sending and receiving update messages.

Once a fast synchronization connection has been established, the restarting speaker and receiving speaker continue to communicate by exchanging update messages. The update messages provide each speaker with updated routing information. In one embodiment, at step 520, once the fast synchronization capability has been established, a receiving speaker sends update messages that include a sequence value to the restarting speaker. In an embodiment, the update messages are update messages like those described above in connection with FIG. 4.

While the restarting speaker is active (e.g., it has not experienced a restart event), as tested at step 522, the restarting speaker receives the update messages with the inserted sequence value at step 524. After receiving an UPDATE message, the restarting speaker extracts the sequence value from the update message at step 526, and stores the route carried in the UPDATE message and the sequence number and router identification information in a checkpoint repository at step 528 (such as checkpoint repository 111 in FIG. 1) and sends an acknowledgement message back to the receiving speaker at step 530. In an embodiment, steps 526-530 are performed by checkpoint logic 121 as described above in connection with FIG. 1. In some embodiments, the steps may be performed in the order illustrated in FIG. 5B. In alternative embodiments, the steps are performed in a different order.

The receiving speaker receives the update acknowledgement messages at step 532 and, in one embodiment, stores the acknowledged sequence number in a repository to indicate the most recently acknowledged update message at step 534. By storing the sequence number, the receiving router can keep track of which update messages may need to be buffered in the event of a restart event. After the acknowledgement has been received, the receiving speaker sends another set of update messages to the restarting router, and control returns to step 520.

If at some point, the restarting speaker becomes unavailable, as shown at step 536, steps are taken to resynchronize routing information according to the fast synchronization techniques described herein.

C. Request Update Messages After a Restart

FIG. 5C is a continuation of the flow diagrams in FIG. 5A and 5B. FIG. 5C illustrates an overview of a method for requesting and receiving update messages after a speaker restarts in a fast synchronization environment.

In an embodiment, after a restart event at step 538, a restarting speaker generates a set of fast synchronization update request messages to send to its peer speakers. The update request messages are generated by first accessing the restarting speaker's checkpoint repository, re-installing all checkpointed routes, and determining which checkpoint marker values should be sent to each receiving speaker connected to the restarting speaker at step 540. The restarting speaker then generates update request messages that include the checkpoint marker values retrieved from the checkpoint repository at step 542. The update request messages, in one embodiment, are BGP OPEN messages created according to the techniques described above in connection with FIG. 3. The update request messages, including the checkpoint marker values, are then sent to the receiving speaker at step 544.

Based on the update request messages, the restarting speaker and receiving speaker exchange as little routing information as possible to reach routing table convergence. For example, in one embodiment, receiving routers send only route updates that have occurred since the checkpoint marker sent by the restarting speaker in the fast synchronization update request message. If the restarting router has no checkpointed routes, then the update request message includes a special value indicating that the receiving speaker should re-send all routes.

1. Receiving Speaker

While the restarting speaker is disconnected from the receiving speaker, the receiving speaker remains actively listening for update request messages at step 546. In an embodiment, the receiving speaker, buffers its update messages at step 548 until it receives an update request message (at least until its memory is full). Buffering update messages allows the receiving speaker to forward unacknowledged update messages to the restarting speaker as soon as an update request message is received. In alternative embodiments, other techniques are used instead of buffering update messages.

When a receiving speaker receives a fast synchronization update request message at step 550 as described herein, the receiving speaker generates a set of update messages to send in response to the request by the restarting speaker at step 552. In one embodiment, each route in the RIB has an associated sequence value stored with it. Thus, when an update request message is received, the receiving speaker extracts the sequence value from the update request message, searches the RIB for the sequence values greater than the requested sequence value, and generates update message from the extracted routes. Based on the search, the receiving speaker selects only those routes that have not been sent to the restarting router. The receiving speaker then sends the update messages to the restarting speaker at step 554.

In one embodiment, assume a receiving speaker crashes while searching the RIB (e.g., performing a table walk) to determine updates. In such a case, the receiving speaker tests whether the requested sequence value received from the restarting speaker is less than or equal to the receiving speaker's last known version of a sequence value. If it is not, in a BGP embodiment, the receiving speaker sends out an OPEN message with a Request Sequence value of zero.

In a BGP embodiment, if the receiving speaker is unable to resend all the updated routes (for example, due to buffer exhaustion), the receiving speaker inserts an Advertise Sequence value of zero into an update UPDATE message. This value indicates that the receiving speaker is unable to send good update messages in response to the fast synchronization request. Once the message has been acknowledged, the receiving speaker then sends its entire Adj-RIB-Out table to the restarting router.

2. Restarting Speaker

A restarting speaker receives the set of update messages from the receiving speaker and evaluates the updates using the same process as set forth in FIG. 5B, steps 524-530. Based on the information included in the update messages, in one embodiment, the restarting speaker updates its routing information using a conventional approach. For example, a restarting BGP speaker treats each UPDATE message as it would a normal UPDATE message by updating its routing information and sending an acknowledgement back to the receiving BGP speaker.

In addition, a restarting BGP speaker may evaluate its stored routes and unmark any routes which had been marked for deletion by its peers because those routes were temporarily stale. In one embodiment, unmarking the stale routes includes storing the Advertise Sequence value of each updated route received from receiving BGP speakers.

In an alternative embodiment, the restarting router maintains a list of all the routes received in the most recent set of updates; thus, the list includes all routes associated with the stored checkpoint marker values. When updates are received after a restart, a comparison is made between the stored list and routes marked for deletion. If a route is on both lists, the route is purged.

In some scenarios, update messages may fall into an exception category, where they need to be handled differently than a normal response to an update request message. For example, in one embodiment, assume a restarting BGP speaker receives a BGP UPDATE message with an Advertise Sequence value of zero. This indicates the receiving BGP speaker does not have the requested update information. In such a case, the restarting BGP speaker purges any routes previously received from that particular peer because those routes may no longer be valid. The restarting BGP speaker then sends a request for the receiving BGP speaker's entire RIB.

In another embodiment, the restarting BGP speaker may check to see if a crash occurred during the fast synchronization update process. This may be detected in a variety of ways, through a dump, inconsistent routing information, inconsistent checkpoint marker values, etc. In one embodiment, after such a crash, the restarting server sends an OPEN message with Request Sequence set to zero, in order to rebuild the routing tables.

In its various embodiments, the restarting BGP speaker may evaluate, purge, or request routing information immediately upon receiving an UPDATE message. In other embodiments, restarting BGP router waits until receiving an End-of-RIB message, or waits for expiration of a timer.

After all the updates have been sent, in an embodiment, an empty update message is sent to the restarting speaker to indicate all of the receiving speaker's updates have been sent. At the same time, the receiving speaker increments its sequence value. Thus, if a crash during the fast synchronization process occurs, the update messages from that receiving router do not need to be resent.

In one embodiment, once all the updates have been made at the restarting speaker, the restarting speaker sends acknowledgement messages indicating it received the set of update messages at step 560. In one embodiment, the restarting speaker only sends one acknowledgement message per receiving speaker. The restarting speaker sends the acknowledgement message after all the update messages have been evaluated for a given receiving speaker. Alternatively, each update message may be acknowledged separately.

The receiving speaker receives the acknowledgement message and, if necessary, updates information on its end (e.g., updates stored sequence values, clears buffer, updates its own routes, etc) at step 562. At this point, both the restarting speaker and receiving speaker proceed to send and receive update messages as described in connection with step 520.

The preceding sections describe how a restarting router 101 achieves convergence after a restart event by reinstalling checkpointed routes and requesting peers to send only route updates with sequence numbers after the last received and acknowledged update message. In an embodiment, a restarting speaker also sends routes to peers after restarting. The steps performed to resend routes from a restarting speaker to a receiving speaker are generally symmetrically similar to the operations described in preceding sections. In general, a restarting speaker receives one or more update messages from peers, retrieves the routes requested in the update messages from the checkpoint store, and sends the routes to the receiving speaker. Retrieving routes from the checkpoint store is performed when the "restarting speaker" has restarted, failed over to a standby route processor, or suffered another kind of fault.

Further, in an embodiment, to fully synchronize, two routers exchange routing tables. For example, a complete synchronizing approach for two routers denoted "A" and "B" using the techniques described in the preceding sections may comprise the processing steps shown in Table 1:

TABLE 1

SYNCHRONIZATION STAGES

1. A restarts
2. B detects the restart
3. A retrieves routes and peer information from the checkpoint store
4. A sends a BGP OPEN message with a request sequence number as determined from stored information about B, which was retrieved from the checkpoint
5. B sends OPEN with request sequence number as determined from stored information about A (this information is not obtained from the checkpoint since B didn't restart)
6. B processes A's OPEN
7. A processes B's OPEN
8. B sends all relevant UPDATE messages
9. A processes UPDATE messages from B
10. A sends all relevant UPDATE messages
11. B processes UPDATE messages from A
12. A sends final ACK to B
13. B sends final ACK to A Not all steps of Table 1 have to occur in the sequence shown in Table 1. For example, steps 6 and 8 can proceed in parallel with steps 7 and 10. That is, router B could be sending to router A multiple UPDATEs at the same time that A is sending another set of multiple UPDATEs to B, and both A and B could be processing incoming UPDATEs at the same time.

IV. Pausing and Resuming Sessions

Figure 7B:
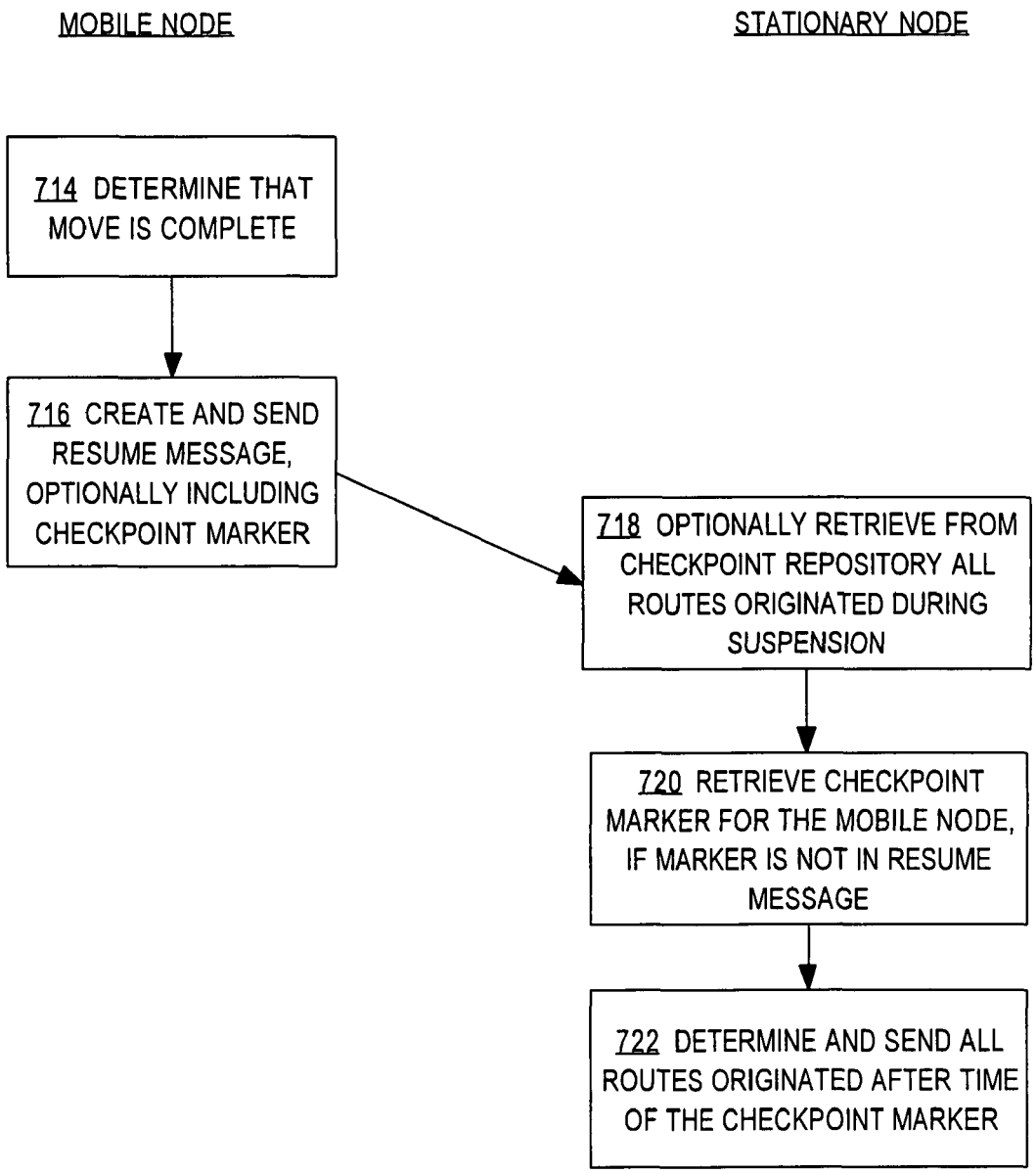
FIG. 7B is a flow diagram of further steps in the process of FIG. 7A.

FIG. 7A is a flow diagram of steps in an example process of pausing and resuming a session. FIG. 7B is a flow diagram of further steps in the process of FIG. 7A. The approach of FIG. 7A, FIG. 7B is broadly applicable to various mobile and non-mobile applications. For example, the approach can be used when a node needs to cease transmission for any reason, or based on an event or a policy. The approach can also be used with devices that move, stop, and move again, such as when nodes move for relatively short periods and then stop for longer periods. The approach also can be used to stabilize a router or other networking device that has excessively high CPU usage.

Referring first to FIG. 7A, in step 701 a mobile node and a stationary node establish a BGP session in conventional manner. For purposes of illustrating a clear example, FIG. 7A refers to one mobile node and one stationary node, but in other embodiments the approach can be used with any number of mobile nodes and any number of stationary nodes. Further, FIG. 7A refers to BGP, but the approach can be used for any other protocol in which a communication session is subject to termination if a period of non-communication occurs.

In step 702, the mobile node determines that a move is about to occur. Step 702 can occur automatically, such as in response to sensing fluctuations in signal strength of a wireless connection to the mobile node. Alternatively, step 702 can occur in response to user input, such as a "Get Ready to Move" command, or performing another functionally equivalent operation.

In step 704, the mobile node creates and sends the stationary node a PAUSE message that includes a checkpoint marker. The checkpoint marker identifies the last route update that the mobile node received from the stationary node and processed successfully. If the mobile node has peering sessions with multiple other nodes, then step 704 involves creating and sending a PAUSE message to each of the other peer nodes, and each PAUSE message includes a checkpoint marker that is appropriate for routes received from the specific peer node to which the message is sent.

In one alternative, in step 704 the PAUSE message is sent without a checkpoint marker. In this alternative, the mobile node stores the checkpoint marker value internally, and later sends the value to the stationary node in a RESUME message when the mobile node is ready to resume communication.

In step 706, the stationary node receives the PAUSE message, and in response, the stationary node suspends the BGP session, including suspending mechanisms that otherwise would cause expiration of the sessions for failure to receive KEEPALIVE messages. During the suspension period, the stationary node sends no BGP UPDATE messages to the mobile node for routes that are originated or updated during the suspension period, but the stationary node may send such messages to other nodes during the suspension period.

In step 708, the stationary node stores the received checkpoint marker in association with information identifying the mobile mode, if the checkpoint marker is present in the PAUSE message. Thus, the stationary node essentially makes a note of the last marker that was processed by the sender. Alternatively, no checkpoint marker is stored, and the stationary node relies on the mobile node to later send a checkpoint marker to indicate what routes are needed.

In step 710, transport protocol keepalive mechanisms are also disabled. For example, all TCP keepalive mechanisms for a TCP connection underlying the BGP session are disabled. In other embodiments, step 710 involves disabling protocols other than TCP that are related to the session that is paused. For example, when the approach of FIG. 7A is used for communication sessions under protocols other than BGP, then other supporting protocols or related protocols may be involved, and are paused, suspended, or disabled at step 710.

Optionally, at step 712, during the period of suspension of the BGP session, the stationary node stores in a checkpoint repository all routes that the stationary node originates or sends to other peers. Step 712 enables the stationary node to rapidly retrieve and send those routes to the mobile node when the mobile node resumes communicating. Alternatively, step 712 can be omitted, and the stationary node can retrieve routes from a RIB or other storage based on the checkpoint marker of the mobile node.

Referring now to FIG. 7B, in step 714, the mobile node determines that movement is complete. Step 714 can involve determining that wireless link signal strength has stabilized. Alternatively, step 714 can occur as a result of user input, such as a user issuing a "Resume Communications" command, or performing another functionally equivalent operation.

In step 716, the mobile node creates and sends a RESUME message to the stationary node. The RESUME message optionally includes the checkpoint marker that the mobile node identified at step 704. Sending the checkpoint marker in the RESUME message enables the stationary node to retrieve and send back routes that originated during the suspension period, that is, routes that were originated or updated at a time later than indicated by the checkpoint marker.

At step 718, in response to receiving the RESUME message, the stationary node optionally retrieves from the checkpoint repository all routes that the stationary node originated or updated during the suspension period. Step 718 is performed when the stationary node has checkpointed routes during the suspension period, as in step 712. In step 720, the stationary node obtains the checkpoint marker for the mobile node, either from the RESUME message or from local storage.

In step 722, the stationary node determines and sends to the mobile node all routes that the stationary node originated or updated after a time indicated by the checkpoint marker. In a BGP embodiment, step 722 involves creating and sending one or more UPDATE messages that contain the routes that were originated or updated during the suspension period. The mobile node then receives and installs the routes according to conventional BGP. By receiving and processing only routes that were originated or updated during the suspension period, the mobile node achieves convergence more rapidly than in prior approaches, processing resources are reduced, and overhead is reduced. There is no need to tear down the BGP session and underlying TCP connection, and there is no need for the peers to perform a full BGP table exchange when the mobile peer becomes available after movement.

In another alternative that uses the "covert mode," the mobile node may need to minimize the number of messages that are transmitted before the mobile node becomes "silent." In this alternative, in lieu of step 704, the mobile node may send a "last gasp" Layer 2 beacon transmission, and the stationary node can receive and interpret the beacon transmission as the PAUSE message. Since such a transmission does not include a checkpoint marker from the mobile node, the stationary node may identify and store a message sequence number or other marker associated with the last acknowledged complete BGP protocol data unit. That sequence number or marker becomes an identifier of the point at which communication paused. Thereafter, the mobile node can send the RESUME message as indicated in step 716, and the mobile node and stationary node can interact subsequently as shown in FIG. 7B.

Thus, the approach of FIG. 7A, FIG. 7B provides, in one embodiment, a mechanism to keep BGP sessions alive with peers to aid in conserving power and improve network convergence times. The approach has many applications when further transmission is not possible, or undesirable. The approach facilitates "covert" operation of networking devices, conserves resources, prevents repeated set-up and tear-down of BGP sessions and TCP connections, prevents network churn and improves convergence properties.

V. Hardware Overview

Figure 6:
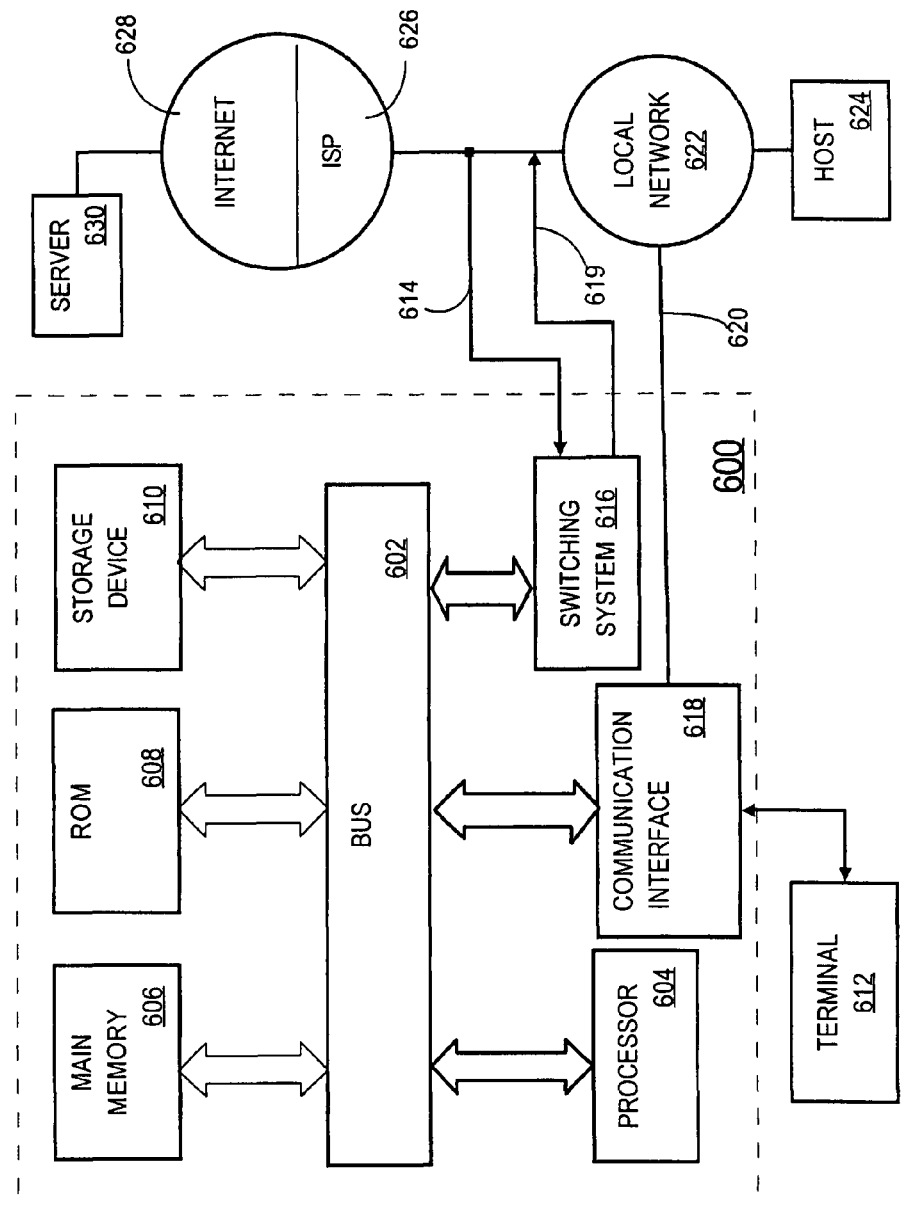
FIG. 6 is a block diagram of a computer system on which embodiments of the present invention may be implemented.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for providing fast synchronization after a router restart. According to one embodiment of the invention, methods for fast synchronization capabilities are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, and volatile media. Non-volatile media includes, for example, optical or magnetic disks, such as storage device 610. Volatile media includes dynamic memory, such as main memory 606.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for fast synchronization as described herein.

The received code may be executed by processor 604 as it is received, and/or stored in storage device 610, or other non-volatile storage for later execution. In this manner, computer system 600 may obtain application code.

VI. Extensions and Alternatives

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

We claim:

1. An electronic data processing apparatus for forwarding data packets in a packet-switched network, the apparatus comprising:

one or more processors;

one or more interfaces that are communicatively coupled to the processors and to one or more other devices in the packet-switched network;

one or more computer-readable media that are communicatively coupled to the one or more processors;

one or more first sequences of instructions recorded on the computer-readable media which, when executed by the one or more processors, cause the one or more processors to interact with the other devices according to Border Gateway Protocol (BGP);

one or more second sequences of instructions recorded on the computer-readable media which, when executed by the one or more processors, cause the one or more processors to perform:

for a BGP Transmission Control Protocol (TCP) session that has been established between a BGP router and a mobile node:

receiving a BGP pause message from the mobile node;

wherein the BGP pause message comprises a request to suspend the BGP TCP session established between the BGP router and the mobile node;

suspending the BGP TCP session between the BGP router and the mobile node using BGP, including suspension of expiration of BGP sessions for lack of keepalive messages;

receiving a BGP resume message from the mobile node, wherein the resume message comprises a checkpoint marker that identifies a sequence number for a last route update that the mobile node received before the suspending;

resuming the BGP TCP session between the BGP router and the mobile node using BGP;

determining and sending to the mobile node all BGP routes that originated after the checkpoint marker.

2. The apparatus of claim 1, wherein the BGP pause message comprises a Layer 2 beacon transmission.

3. The apparatus of claim 2, further comprising other instructions in the second sequence of instructions which when executed cause performing, in response to receiving the Layer 2 beacon transmission, identifying and storing in the repository a marker value associated with a last acknowledged complete BGP protocol data unit.

4. The apparatus of claim 1, wherein the instructions for suspending comprise further instructions which when executed cause sending no BGP UPDATE messages to the mobile node but sending BGP UPDATE messages to other nodes.

5. The apparatus of claim 1, wherein the instructions for determining comprise further instructions which when executed cause retrieving from the repository all routes that were originated during the suspending.

6. The apparatus of claim 1, further comprising additional instructions which, when executed, cause disabling transport protocol keepalive mechanisms in response to receiving the BGP pause message.

7. The apparatus of claim 1, wherein the apparatus comprises any one of a router, switch, and route reflector.

8. The apparatus of claim 1, wherein each of the checkpoint markers comprises any one of a number, a sequence number, a timestamp, and a hash value.

9. An electronic data processing apparatus for forwarding data packets in a packet-switched network, the apparatus comprising:

one or more processors;

one or more interfaces that are communicatively coupled to the processors and to one or more other devices in the packet-switched network;

one or more computer-readable media that are communicatively coupled to the one or more processors;

one or more first sequences of instructions recorded on the computer-readable media which, when executed by the one or more processors, cause the one or more processors to interact with the other devices according to Border Gateway Protocol (BGP);

one or more second sequences of instructions recorded on the computer-readable media which, when executed by the one or more processors, cause the one or more processors to perform:

for a BGP Transmission Control Protocol (TCP) session that has been established between a BGP router and a mobile node:

receiving a BGP pause message from the mobile node, wherein the pause message comprises a checkpoint marker that identifies a last route update that the mobile node received;

in response to receiving the BGP pause message, storing, in a data repository, the checkpoint marker;

wherein the BGP pause message comprises a request to suspend the BGP TCP session established between the BGP router and the mobile node;

suspending the BGP TCP session between the BGP router and the mobile node using BGP, including suspending of expiration of BGP sessions for lack of keepalive messages;

receiving a BGP resume message from the mobile node;

in response to receiving the BGP resume message, retrieving the checkpoint marker from the repository, and resuming the BGP TCP session between the BGP router and the mobile node using BGP;

determining and sending to the mobile node all BGP routes that originated after the checkpoint marker.

10. The apparatus of claim 9, wherein the BGP pause message comprises a Layer 2 beacon transmission.

11. The apparatus of claim 10, further comprising additional instructions which, when executed, cause: in response to receiving the Layer 2 beacon transmission, identifying and storing in the repository a marker value associated with a last acknowledged complete BGP protocol data unit.

12. The apparatus of claim 9, wherein the instructions for suspending comprise instructions for sending no BGP UPDATE messages to the mobile node but sending BGP UPDATE messages to other nodes.

13. The apparatus of claim 9, wherein the instructions for determining comprise instructions for retrieving from the repository all routes that were originated during the suspending.

14. The apparatus of claim 9, further comprising instructions for disabling transport protocol keepalive mechanisms in response to receiving the BGP pause message.

15. The apparatus of claim 9, wherein the apparatus comprises any one of a router, switch, and route reflector.

16. The apparatus of claim 9, wherein each of the checkpoint markers comprises any one of a number, a sequence number, a timestamp, and a hash value.

17. An electronic data processing apparatus for forwarding data packets in a packet-switched network, the apparatus comprising:

means for interacting with a mobile node according to Border Gateway Protocol (BGP);

for a BGP Transmission Control Protocol (TCP) session that has been established between a BGP router and the mobile node:

means for receiving a BGP pause message from the mobile node;

wherein the BGP pause message comprises a request to suspend the BGP TCP session established between the BGP router and the mobile node;

means for suspending the BGP TCP session between the BGP router and the mobile node using BGP, including suspension of expiration of BGP sessions for lack of keepalive messages;

means for receiving a BGP resume message from the mobile node, wherein the resume message comprises a checkpoint marker that identifies a last route update that the mobile node received before the suspending;

means for resuming the BGP TCP session between the BGP router and the mobile node using BGP;

means for determining and sending to the mobile node all BGP routes that originated after the checkpoint marker.

18. The apparatus of claim 17, wherein the BGP pause message comprises a Layer 2 beacon transmission.

19. The apparatus of claim 18, further comprising means for identifying and storing in the repository a marker value associated with a last acknowledged complete BGP protocol data unit in response to receiving the Layer 2 beacon transmission.

20. The apparatus of claim 17, further comprising means for sending no BGP UPDATE messages to the mobile node but sending BGP UPDATE messages to other nodes.

21. The apparatus of claim 17, further comprising means for retrieving from the repository all routes that were originated during the suspending.

22. The apparatus of claim 17, further comprising means for disabling transport protocol keepalive mechanisms in response to receiving the BGP pause message.

23. The apparatus of claim 17, wherein the apparatus comprises any one of a router, switch, and route reflector.

24. The apparatus of claim 17, wherein each of the checkpoint markers comprises any one of a number, a sequence number, a timestamp, and a hash value.

25. A method performed in an electronic data processing apparatus for forwarding data packets in a packet-switched network, comprising:

for a Border Gateway Protocol (BGP) transmission Control Protocol (TCP) session that has been established between a BGP router and a mobile node:

receiving a BGP pause message from the mobile node;

wherein the BGP pause message comprises a request to suspend the BGP TCP session established between the BGP router and the mobile node;

suspending the BGP TCP session between the BGP router and the mobile node using BGP, including suspension of expiration of BGP sessions for lack of keepalive messages;

receiving a BGP resume message from the mobile node, wherein the resume message comprises a checkpoint marker that identifies a last route update that the mobile node received before the suspending;

resuming the BGP TCP session between the BGP router and the mobile node using the BGP;

determining and sending to the mobile node all BGP routes that originated after the checkpoint marker.

26. The method of claim 25, comprising receiving the BGP pause message as a Layer 2 beacon transmission and identifying and storing in the repository a marker value associated with a last acknowledged complete BGP protocol data unit in response to receiving the Layer 2 beacon transmission.

27. The method of claim 25, further comprising sending no BGP UPDATE messages to the mobile node but sending BGP UPDATE messages to other nodes.

28. The method of claim 25, comprising retrieving from the repository all routes that were originated during the suspending.

29. An apparatus comprising:

one or more processors;

logic coupled to the one or more processors for execution and when executed operable to cause the one or more processors to perform:

for a Border Gateway Protocol (BGP) Transmission Control Protocol (TCP) session that has been established between a BGP router and a mobile node:

receiving a BGP pause message from the mobile node, wherein the BGP pause message comprises a request to suspend the BGP TCP session established between the BGP router and the mobile node, suspending the BGP TCP session between the BGP router and the mobile node using BGP, including suspension of expiration of BGP sessions for lack of keepalive messages, receiving a BGP resume message from the mobile node, wherein the resume message comprises a checkpoint marker that identifies a last route update that the mobile node received before the suspending, resuming the BGP TCP session between the BGP router and the mobile node using BGP, and determining and sending to the mobile node all BGP routes that originated after the checkpoint marker.

30. The apparatus of claim 29, further comprising logic which when executed by the one or more processors, causes the one or more processors to perform receiving the BGP pause message as a Layer 2 beacon transmission, and identifying and storing in the repository a marker value associated with a last acknowledged complete BGP protocol data unit in response to receiving the Layer 2 beacon transmission.

31. The apparatus of claim 29, further comprising logic which when executed by the one or more processors, causes the one or more processors to perform sending no BGP UPDATE messages to the mobile node but instead, sending BGP UPDATE messages to other nodes.

32. The apparatus of claim 29, further comprising logic which when executed by one or more processors, causes the one or more processors to perform retrieving from the repository all routes that were originated during the suspending.

* * * * *